United States Patent Office 3,217,428
Patented Nov. 16, 1965

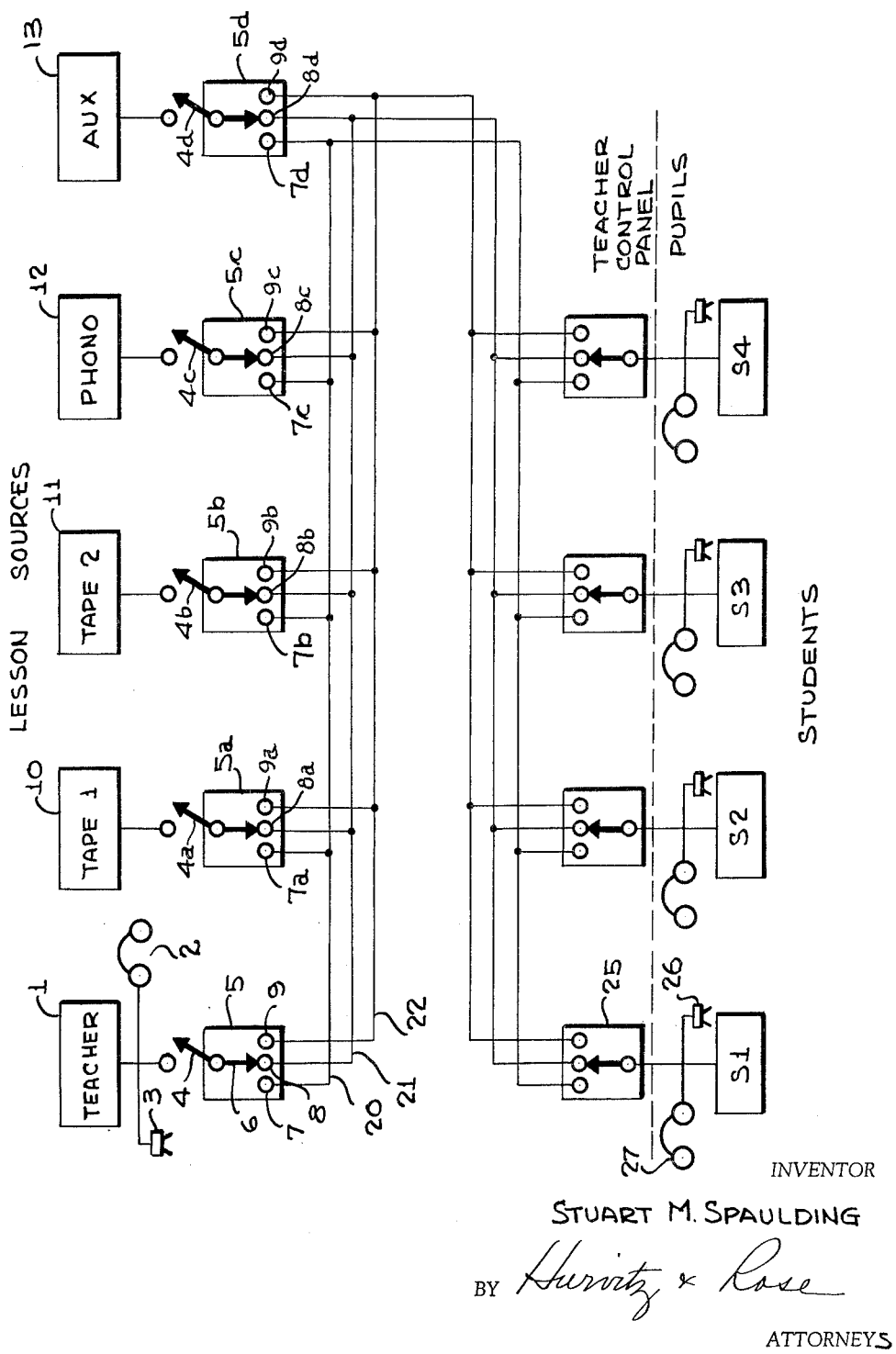

3,217,428
TEACHING LABORATORY
Stuart M. Spaulding, Main St., New London, N.H.
Filed July 24, 1963, Ser. No. 297,252
8 Claims. (Cl. 35—35)

The present invention relates generally to language laboratories, and more particularly to systems for selectively interconnecting a teacher station, and a plurality of magnetic tape record-reproduce machines at the teacher station with a plurality of remote student stations, at which are located further magnetic tape record-reproduce machines, the interconnection circuit employed providing continuous and automatic monitoring of the status of all stations and machines, in respect to their interconnections.

In a language laboratory, a teacher faces a control panel and each pupil is located in a booth with a glass front and acoustically silenced sides. Each student may be provided with a tape recorder-reproducer and he wears a microphone and earphones. The teacher has a tape reproducer at her console, which the teacher can connect to any selected earphones and tape machine of the students. The teacher normally has available a group of tape reproducers, each containing different materials, and instructs a group of students, to whom the materials are selectively routed.

The material routed to a student is recorded at his recorder, on one track, and he can record his own answers or pronounciation or the like on another track, of the tape machine. The teacher may selectively listen to the students, or communicate with them.

In the past the required selective interconnection of students and teacher has been accomplished by means of a multiple position rotary switch for each student. This has proven expensive to install and confusing to operate.

It is a feature of the present invention to eliminate the rotary switches of the prior art and to substitute a more effective system of intercommunication, utilizing three position color coded switches at both the teacher's position, for each tape recorder-reproducer, and for each pupil's position. The switches each have associated colored lights, which indicate at all times the settings of the switches, so that teachers have full visually generated knowledge of the status of interconnections of the system, and the teacher can readily perform switching operations.

It is, accordingly, a primary object of the present invention to simplify language laboratories, while improving their operation.

It is another object of the present invention to provide flexible intercommunication between a teacher and pupils, in a language laboratory, by utilizing three position color coded switching at each tape deck of the teacher control position.

The above and still further objects, features and advantages of the present invention will become apparent upon consideration of the following detailed description of one specific embodiment thereof, especially when taken in conjunction with the accompanying drawings, wherein:

The single figure of the drawings is a block diagram of a system according to the invention.

Referring now to the drawings, the reference numeral 1 denotes a teacher station. The teacher is provided at her station with earphones 2 and a microphone 3. These proceed via on-off switch 4 to a three position color coded distribution switch 5. The latter includes a movable contact 6 and three stationary contacts 7, 8, 9. Each stationary contact is associated with a source of light, which may be selectively purple, red and green, respectively, for example only, since the actual colors can be selected at will. For example, sources of light may be unmasked selectively according to switch position, in a manner which is well known per se, and which forms no part of the invention. The color coded switches are purchasable from Switchcraft, Chicago, Illinois, and may be identified as their Series 25000.

At the teacher position are located several tape reproducers 10, 11, etc. a phonograph 12 for supplying music, and an auxiliary channel 13, which may be used for a further recorder-reproducer or for any other desired purpose. Each position, as 10, 11, 12, 13, is supplied with an on-off switch 4a–4d and a distribution switch 5a–5d, which are precisely as switches 4 and 5 at teacher's position 1.

All the stationary contacts 7, 7a, 7b, 7c and 7d are connected to a common bus 20, all the stationary contacts 8, 8a, 8b, 8c, and 8d to a common bus 21, and all the stationary contacts 9, 9a, 9b, 9c, and 9d to a common bus 22.

Each student recorder-reproducer, as S1, S2, S3, S4 is connected to the buses 20, 21, 22, via a selective color coded three position switch as 25, and each is associated with a microphone as 26 and earphones, as 27. All selective switches in the system are duplicated.

In operation, if a French lesson is placed on tape 1, the teacher can assign bus 20, 21 or 22, at will to that tape, by means of selective switch 5a, and the identity of the selected bus would be visually obvious. She could then place any student selective switch or switches 25 on the same channel, and would visually be continuously apprised of which connection had been made, by virtue of the color coding of the switches. So the position at tape 1 would correspond in terms of color (say green) with the color visible at the selected students switches 25. The teacher can monitor any selected channel at will by means of switch 5.

If a Spanish lesson were available on tape 2, that tape could be assigned to channel 21, color coded red. The switches 25 pertaining to "Spanish" pupils, would then be set to show red.

The teacher can speak to or listen to, and in general communicate with any student, over any channel, by means of microphone 3, and/or listen, by means of earphones 2, using switch 4 to complete the channel and selective switches 5 . . . 25 to select the channel.

The teacher can also monitor the lesson material on any channel, as it is being distributed to the students, and by means of microphone 3 and phones 2 communicate directly with a student.

The present system accordingly provides an extremely flexible system of interconnection, between a teacher position, and plural tapes and the like, on the one hand, and a plurality of students on the other. It provides, as an essential feature, for color coding of the selective switches involved so that a teacher can know, at all times, by visual inspection of colors, which students are in communication with any given tape, or with her station, or both. Modification of the distribution of material, by the teacher, is quick and the results are unmistakable, so that a large class can be monitored and instructed by a single teacher, who can pay primary attention to teaching, since she will not be distracted by the necessity for operating a complex switching system, as in the past.

While lesson devices S1, S2 etc. have been referred to as tape recorder-reproducers, it is not the unusual practice to utilize these. Some teaching laboratories incorporate listen/respond student amplifiers, so that the student hears the lesson and also hears his own response to it, with no ability to record. The various modifications of the present system which are current in the industry are intended to be incorporated in the present invention. In particular, devices S1, S2 . . . may be physically located elsewhere than at the student's location, i.e. at the teacher's panel.

While I have described and illustrated one specific embodiment of my invention, it will be clear that variations of the details of construction which are specifically illustrated and described may be resorted to without departing from the true spirit and scope of the invention as defined by the appended claims.

What I claim is:

1. A teaching laboratory having a teacher position and a plurality of machine positions for dispensing teaching material in the form of electrical signals, said teacher position including a microphone and earphones, a color coded multiple position selective switch at each of said positions, said switch including at least one movable contact and at least three stationary contacts, said movable contacts being connected one for one with said positions, a separate bus connected simultaneously to corresponding stationary contacts of all said switches, a plurality of pupil positions, a two channel tape recorder-reproducer for each of said pupil positions, a further color coded multiple position selective switch associated with each of said tape recorder-reproducers, said further switches each including at least one movable contact connected to a tape recorder-reproducer and at least three stationary contacts, corresponding stationary contacts of all of said switches being connected to separate ones of said buses, the color coding of all said switches being indicative of which of said buses said positions are connected to, whereby the interconnections of said teacher position and said machine positions with all of said pupil positions will be visually obvious at all times in terms of visually evident colors at said switches.

2. A teaching laboratory having a teacher position and a plurality of student positions comprising:
   a plurality of teaching sources at said teacher position for providing teaching material in the form of electrical signals;
   a plurality of conducting leads interconnecting said teacher position with said plurality of student positions;
   means at said teacher position for connecting any of said plurality of conducting leads selectively to each of said plurality of student positions; and
   means at said teacher position for selectively connecting any of said plurality of teaching sources to any of said plurality of conducting leads so that a teacher may selectively provide each student position with any combination of different teaching materials.

3. The teaching laboratory of claim 2 wherein said means for connecting any of said plurality of conducting leads selectively to each of said plurality of said student positions comprises:
   a plurality of distribution switches, one for each of said plurality of student positions;
   each of said distribution switches including a movable contact and a plurality of stationary contacts, one stationary contact for each of said plurality of conducting leads;
   means for connecting said movable contacts one for one with said student positions; and
   means for connecting all corresponding ones of said stationary contacts to a different one of said conducting leads.

4. The teaching laboratory of claim 2 wherein said means for selectively connecting any of said plurality of teaching sources to any of said plurality of conducting leads comprises:
   a plurality of distribution switches, one for each of said plurality of teaching sources;
   each of said distribution switches including a movable contact and a plurality of stationary contacts, one stationary contact for each of said plurality of conducting leads;
   means for connecting said movable contacts one for one with said teaching sources; and
   means for connecting all corresponding ones of said stationary contacts to a different one of said conducting leads.

5. The teaching laboratory of claim 2 further comprising:
   a plurality of visual indicators, one for each of said plurality of teaching sources and one for each of said plurality of student positions;
   each visual indicator having a number of different indications, one indication for each of said plurality of conducting leads; and
   means for activating each of said visual indicators to cause an indication depending upon which conducting lead its associated teaching source or student position is connected to.

6. A teaching laboratory of claim 2 further comprising:
   a plurality of light indicators, one light indicator for each of said plurality of teaching sources, and one light indicator for each of said plurality of student positions;
   each light indicator selectively displaying a number of different colors, one color for each of said plurality of conducting leads; and
   means for energizing each of said light indicators to display a color depending upon which conducting lead its associated teaching source or student position is connected to.

7. The teaching laboratory of claim 2, further comprising:
   means at said teacher position for allowing the teacher to selectively communicate with any student via any of said plurality of conducting leads.

8. The teaching laboratory of claim 2 further comprising:
   means at said teacher position for allowing the teacher to selectively monitor the combination of teaching materials on any of said plurality of conducting leads.

References Cited by the Examiner

UNITED STATES PATENTS 3,066,245   11/1962   Baker et al. _____ 307—38 X

OTHER REFERENCES

Anderson, L. J.: "The Language Laboratory," article in RCA Engineer Magazine, February-March 1960, vol. 5, No. 5, pages 32–34. Available in Group 470. 35–35.3.

Language Laboratory Systems installation manual, dated June 1959. Received in Patent Office Dec. 4, 1961, IB—33297. Page 27 relied on. Available in Group 470 35–35.3.

Audio Teaching Center brochure, Cat. 960. Received in the Patent Office June 7, 1961. Four pages, page 2 relied on. Available in Group 470. 35–35.3.

EUGENE R. CAPOZIO, *Primary Examiner.*

LAWRENCE CHARLES, *Examiner.*